Figure 1:
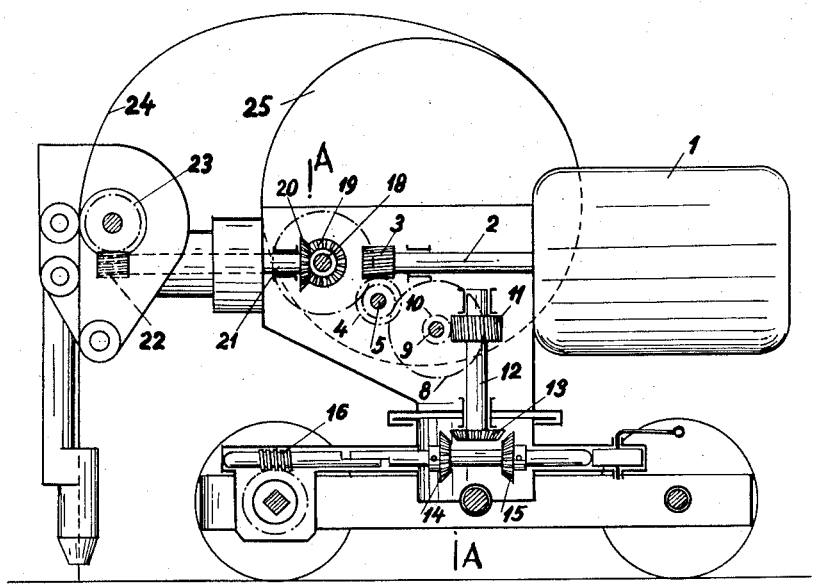

Aug. 12, 1958 M. MOSNY 2,847,558
GEARBOX FOR UNIVERSAL AUTOMATIC WELDING MACHINES
Filed Aug. 31, 1955

United States Patent Office 2,847,558
Patented Aug. 12, 1958

2,847,558

GEARBOX FOR UNIVERSAL AUTOMATIC WELDING MACHINES

Martin Mosný, Bratislava, Czechoslovakia, assignor of one-half to CKD Ceska Lipa, narodni podnik, Ceska Lipa, Czechoslovakia Application August 31, 1955, Serial No. 531,790

Claims priority, application Czechoslovakia September 4, 1954

4 Claims. (Cl. 219—125)

The automation of the welding operations enables the productivity in the field of welding to be substantially increased. The devices aiming at such automation have already been developed to a high degree and are now introduced into production as welding tractors or so called welding automates.

An indispensable condition to be fulfilled by such automatic devices is their possibility of universal application, rendered possible by small dimensions, low weight and easy handling. The automatic welding appliances known hitherto have not complied with all these requirements, their general arrangement being still intricate and their weight relatively high.

The automatic welding apparatus consists, in principle, of the undercarriage and of the upper part. The undercarriage carrying the upper part enables the latter to be swivelled about a vertical axis, to be shifted across the undercarriage and to be run along the weld.

The upper part of the automatic welding set consists, in principle, of a driving motor, a gearbox, a welding head and of the wire supply drum, wherefrom the welding wire (electrode) is unwound.

The present invention has for its object such an arrangement of the gearbox which enables with the use of a single electric motor, the speed of the feed of the welding wire into the weld and the speed of the travel of the welding set along the weld to be easily changed by a readily achieved exchange of the gears inside the gearbox.

The gearbox according to the present invention consists of two parts, the upper part being mounted pivotally on the lower part. In the upper part the change gears are mounted for the feeding movement of the welding wire and for the travelling of the undercarriage and in the lower part the mechanism is provided for reversing the travelling direction of the automatic welding set or for its standstill and moreover a worm gear for the drive of the undercarriage wheels. The lower part of the gearbox is shiftable across the undercarriage.

The drive of the exchangeable gears in the upper part of the gearbox is derived, in accordance with the present invention, from both ends of the first layshaft and the exchangeable gears are mounted on this shaft equidistantly at both sides of the plane of symmetry of the upper part of the gearbox.

This arrangement enables a co-axial mounting of the shafts of the electric motor and of the exchangeable casing of the welding head. The manufacture of the gearbox is greatly simplified by the arrangement according to the present invention, leading to a substantial reduction of the production cost and moreover the automatic welding set is able of universal application thanks to its small dimensions.

The small size of the automatic welding set made possible by the arrangement of the gearbox in accordance with the present invention makes it possible to use this welding set e. g. for welding operations inside closed vessels into which the automatic welding apparatus is brought through a manhole or for the inner welds in tubes having a minimum inner diameter of 450 mm.

The small weight of about 25 kg. of the automatic welding apparatus arranged in accordance with the present invention ensures its displacement without the necessity of using a crane. Its simple construction facilitates the handling and attendance.

Figure 2:
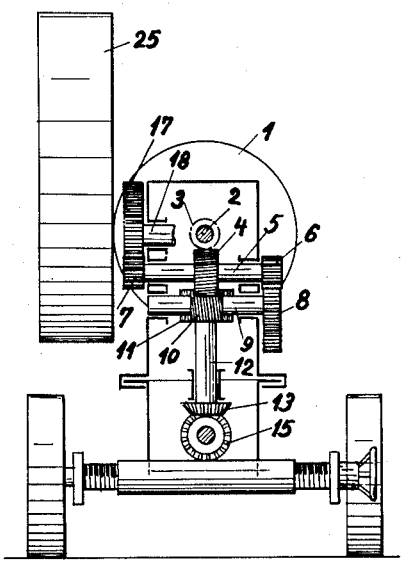

The accompanying drawing illustrates, merely by way of example, an embodiment of the gearbox and the general arrangement of the automatic welding apparatus according to the present invention in a diagrammatic manner. Fig. 1 shows an elevational view of the automatic welding apparatus with a diagrammatic illustration of the mechanism for the feed of the welding wire (electrode) unwound from the supply drum and the mechanism for the travel of the automatic welding apparatus. Fig. 2 shows a side view of the automatic welding apparatus along the line A—A, with the transverse shafts for the exchangeable gears.

The electric motor 1 is connected through the shaft 2 with the worm 3 driving the worm wheel 4 of the first layshaft 5. At both ends of the shaft 5 the exchangeable gears 6, 7 are mounted equidistantly on both sides of the plane of symmetry of the upper part of the gearbox. The gear 6 drives the exchangeable gear 8 mounted on the shaft 9 with the worm 10 in gear with the worm wheel 11 mounted on the vertical shaft 12. At the other end of the shaft 12 a bevel gear 13 is mounted which is alternatively in gear or out of gear with the bevel gear 14 or 15 on the shiftable shaft provided in the lower part of the gearbox in the undercarriage of the automatic welding set. The shiftable shaft is in permanent gear with the worm gear 16 for the drive of the undercarriage wheels. The exchangeable gear 7 is in gear with the exchangeable gear 17 on the shaft 18 for pivoting the bevel gear 19 in gear with the bevel gear 20 on the shaft 21 which is supported in the axis of the exchangeable casing of the welding head. On the other end of the shaft 21 the worm 22 is mounted for gear with the worm wheel 23, on the axis of which a pulley is mounted for feeding the welding wire 24 unwound from the supply drum 25.

I claim:

1. In an automatic, universally mobile arc welding machine having an undercarriage with wheels thereon to movably support the latter, a welding head and means for feeding welding rod to the welding head; the combination of a gear box including a lower part mounted on the undercarriage and an upper part mounted rotatably on said lower part for unrestricted swinging relative to the latter about a vertical axis and adapted to support the welding head, a motor on said upper part having a rotated motor shaft, a layshaft journalled in said upper part, meshing gear means on said layshaft and motor shaft transmitting rotation of the latter to said layshaft, a rotatable drive shaft coaxial with the axis of rotation of said upper part and extending from the latter into said lower part of the gear box, transmission means between said layshaft and drive shaft within said upper part, a first bevel gear on said drive shaft within said lower part, drive transmission means within said lower part adapted to reversibly drive wheels of the carriage and including a drive transmission shaft journalled in said lower part and extending at right angles to said drive shaft and second and third bevel gears on said drive transmission shaft at opposite sides of said first bevel gear and selectively engageable with the latter to reversibly drive said drive transmission shaft from said drive shaft, a drive shaft extending horizontally from said upper part and adapted to actuate the means for feeding welding rod to the welding head, and transmission means within said upper part between said layshaft and said horizontally extending drive shaft for rotating the latter from said layshaft so that both the feeding of welding rod to the head and the driving of the undercarriage wheels can be simultaneously effected from said motor.

2. In an automatic, universally mobile arc welding machine; the combination as in claim 1, wherein said transmission means between said layshaft and said drive shaft coaxial with the axis of rotation of the upper part includes a first idler shaft parallel to said layshaft and meshing gear means on said layshaft and first idler shaft and on the latter and said drive shaft coaxial with the axis of rotation of the upper part, and wherein said transmission means between said layshaft and said horizontally extending drive shaft includes a second idler shaft parallel to said layshaft and meshing gear means on said layshaft and second idler shaft and on the latter and said horizontally extending drive shaft.

3. In an automatic, universally mobile arc welding machine; the combination as in claim 2, wherein said layshaft extends laterally with respect to the plane of symmetry of said upper part of the gear box, and wherein said meshing gear means on said layshaft and said first and second idler shafts, respectively, are disposed at opposite sides of said plane of symmetry and equidistant from the latter.

4. In an automatic, universally mobile arc welding machine; the combination as in claim 3, wherein said motor shaft and said horizontally extending drive shaft are in axial alignment with each other, said horizontally extending drive shaft defining an axis of rotation for the welding head on said upper part of the gear box and said meshing gear means on said second idler shaft and said horizontally extending drive shaft consisting of meshing bevel gears on the respective shafts.

References Cited in the file of this patent

UNITED STATES PATENTS

| | | |
|---|---|---|
| 1,462,939 | Lombard | July 24, 1923 |
| 1,580,020 | Cutler et al. | Apr. 6, 1926 |
| 1,636,104 | Murray et al. | July 10, 1927 |